(12) United States Patent
Simpson (10) Patent No.: US 6,283,699 B1
(45) Date of Patent: *Sep. 4, 2001

(54) CONTAINER HANDLING SYSTEMS (76) Inventor: Ross Allan Simpson, 78 Spencer St., Andersons Bay, Dunedin 9001 (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,357

(22) PCT Filed: Mar. 29, 1996

(86) PCT No.: PCT/NZ96/00026

§ 371 Date: Sep. 30, 1997

§ 102(e) Date: Sep. 30, 1997

(87) PCT Pub. No.: WO96/31430

PCT Pub. Date: Oct. 10, 1996

(30) Foreign Application Priority Data

Mar. 31, 1995 (NZ) .................................................. 270851

(51) Int. Cl.⁷ ........................................................ B60P 1/48
(52) U.S. Cl. ........................ 414/546; 414/547; 212/261
(58) Field of Search .................................. 414/470, 486, 414/491, 496, 546, 547, 695, 695.5; 212/238, 245, 258, 261, 297

(56) References Cited

U.S. PATENT DOCUMENTS

| | | | |
|---|---|---|---|
| 2,771,197 | * 11/1956 | Leffler | 414/547 X |
| 3,174,630 | 3/1965 | Tantlinger et al. | 212/304 |
| 3,451,559 | * 6/1969 | Haines | 212/258 X |
| 3,612,308 | 10/1971 | Klaus | 414/546 |
| 3,726,421 | * 4/1973 | Goldhofer | 414/547 |
| 3,774,789 | * 11/1973 | Klaus et al. | 414/546 |
| 3,876,088 | * 4/1975 | Klaus | 414/546 X |
| 4,601,626 | * 7/1986 | Heine et al. | 212/245 X |
| 4,921,394 | * 5/1990 | Watson | 414/546 |
| 5,211,245 | * 5/1993 | Relyea et al. | 212/238 X |
| 5,282,714 | * 2/1994 | Diebott | 212/261 X |
| 5,688,100 | * 11/1997 | Wunder et al. | 414/547 |

FOREIGN PATENT DOCUMENTS

| | | | |
|---|---|---|---|
| 221718 | * 5/1959 | (AU) | 414/695.5 |
| 1756757 | 6/1970 | (DE) . | |
| 1967029 | 9/1976 | (DE) . | |
| 3104166 | * 9/1982 | (DE) | 414/546 |
| 431310 | * 11/1911 | (FR) | 414/546 |
| 1163242 | 9/1969 | (GB) . | |
| 1178074 | 1/1970 | (GB) . | |
| 1232096 | 5/1971 | (GB) . | |
| 1306434 | 2/1973 | (GB) . | |
| 1081028 | * 3/1984 | (SU) | 414/546 |
| 1623895 | * 1/1991 | (SU) | 414/546 |
| 1745578 | * 7/1992 | (SU) | 414/547 |

* cited by examiner

Primary Examiner—James W. Keenan
(74) Attorney, Agent, or Firm—Fish & Richardson P.C.

(57) ABSTRACT

A mechanism for loading and unloading a container onto a tray attached or attachable to a track or trailer vehicle. The mechanism includes a transverse assembly at each end of the tray, each assembly incorporating a centrally mounted telescoping boom, a lower part of which incorporates an extension to which opposed hydraulic rams are linked. The hydraulic rams control the swinging movement of the boom when one retracts and the other extends.

8 Claims, 8 Drawing Sheets

CONTAINER HANDLING SYSTEMS

FIELD OF THE INVENTION

This invention relates to the transportation of containers and particularly to a mechanism for loading and unloading of containers onto vehicles.

BACKGROUND OF THE INVENTION

At present a number of constructions of container lifter are available and most of these are designed to lift shipping type containers onto the tray of a truck or trailer unit from only one side of the vehicle. This has disadvantages in certain situations where extra effort is required to shift the vehicle into a position where loading and unloading is required. Another problem with container handling is that most current lifters are designed to carry fully loaded containers and as such are built structurally to withstand weights of up to 20 to 40 tonnes. These constructions of lifter are therefore very expensive to run and construct, and are unnecessary when containers are carried empty. Empty containers are carried very regularly from site to site or after use to a cleaning or repair facility.

An object of the invention is to provide a relatively simple inexpensive mechanism for loading and unloading a vehicle from either side, preferably, the mechanism can also enable the stacking of containers.

Further objects and advantages of the invention will become apparent from the following description which is given by way of example.

SUMMARY OF THE INVENTION

According to one aspect of the invention there is provided a mechanism for loading or unloading a container onto a tray attached to or attachable to a truck or trailer vehicle, the mechanism including a transverse assembly at each end of the tray, each assembly incorporating a centrally mounted telescoping boom, a lower part of which incorporates an extension to which opposed hydraulic rams are linked, the hydraulic rams being adopted to control transverse movement of the boom when one retracts and the other extends. Each assembly can also incorporate an each side of the tray a stabilising leg, the arrangement being such that in a travelling position the stabilising legs are parked generally upright on or relative to the tray and the boom is retracted to be either upright on the tray or angled slightly from vertical to reduce the vertical height of the vehicle. In an operative position the stabilising legs can be down in contact with the ground. The booms are extended to enable cables, chains or strops to be used to raise a container and swing it on or off the tray of the vehicle.

In a further aspect of the invention provides means of stacking containers on a deck of a truck or trailer vehicle.

Further aspects of the invention which should be considered in all its novel aspects will become apparent from the following description. For example, preferred embodiments of the mechanism or vehicle of the invention may include one or both of the following additional features: each hydraulic ram, when retracted, is aligned substantially at right angles to the boom, and/or each hydraulic ram has a housing from one end of which a ram rod extends, the housing being attached substantially adjacent one end to a fixed part of the assembly.

Examples of the invention will now be described with reference to the accompanying drawings.

DESCRIPTION OF THE PREFERRED EMBODIMENTS

The examples of the invention will be described with reference to a mechanism for loading containers which is mounted on the tray of a vehicle (not shown). It is however to be appreciated that the mechanism can be integrally formed with me tray of a now or reconditioned vehicle or trailer, or other form of transportation, if required.

The first example shown in FIGS. 1 to 8 is mounted on the tray 1 of a vehicle and the mechanism is generally indicated by arrow 2 and consist of elongate chassis members 3 linked by suitable members including forklift entry ports 4. The chassis members 3 incorporate appropriate locking mechanisms 5 for locating the chassis to the tray 1 of the vehicle (not shown). The chassis members 3 also incorporate container locks 6 used to locate a shipping container 7 on the chassis when the mechanism is used on a vehicle. The chassis members 3 have mounted at each end a transverse assembly 8. The assembly 8 is shown in detail in FIG. 8. Each assembly 8 consists of a transverse base 9 an upper point 10 of which includes a pivot point 11 for a centrally mounted telescoping boom 12. The boom 12 is telescoped by one or more hydraulic rams (not shown) mounted in the boom 12.

Hydraulic power for the hydraulic rams in the boom 12 is supplied either from a power pack (not shown) positioned on extension 13 of the chassis 3 or if the vehicle on which the device is used has its own power supply the hydraulics for the hydraulic rams are driven by this power source.

Figure 1:
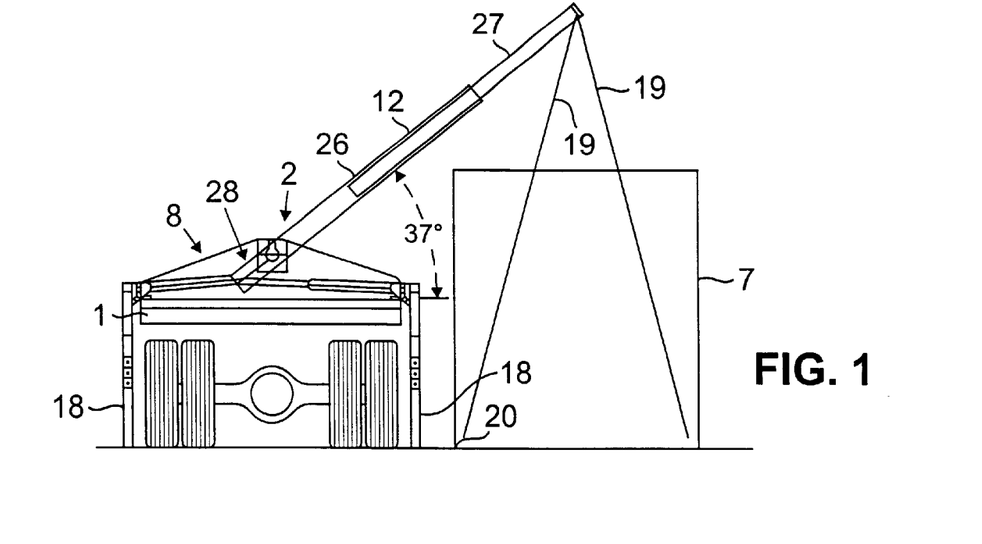
FIG. 1 is an and view of a vehicle incorporating the invention which is shown in a position ready to pick up a container.
Figure 2:
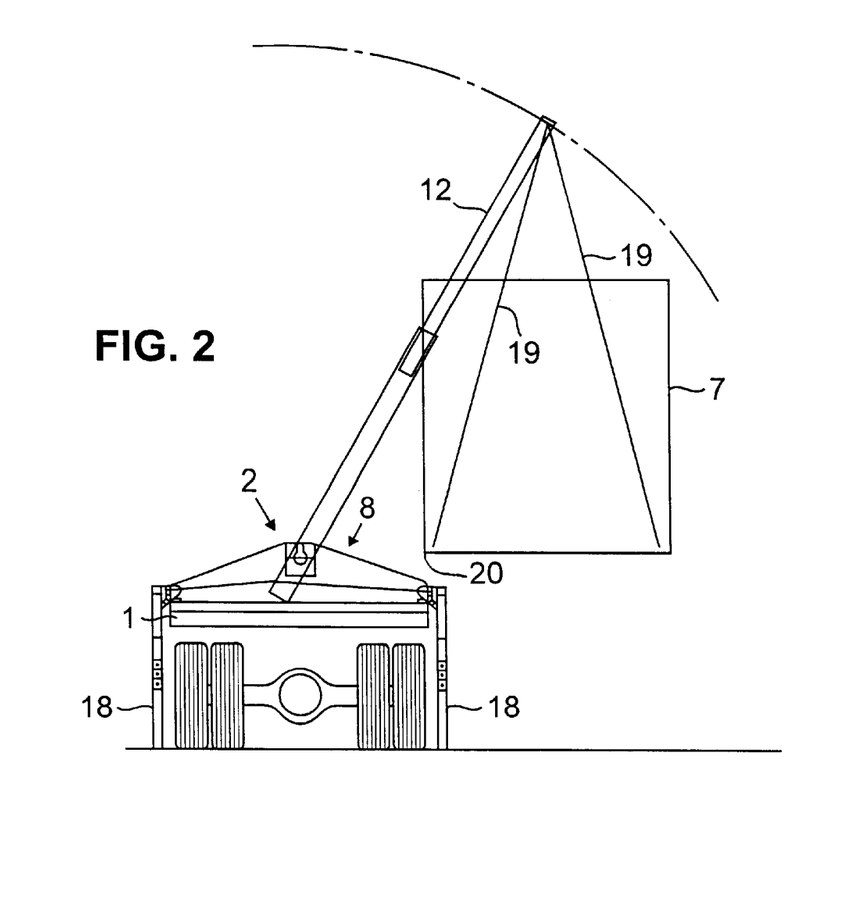
FIG. 2 is an end view of the container handling system shown in FIG. 1 in position with the container on the deck.
Figure 3:
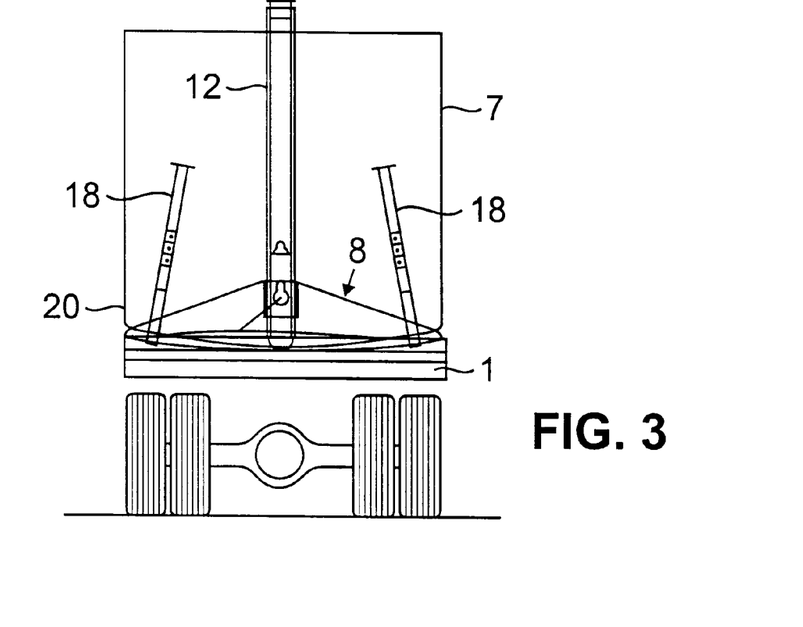
FIG. 3 is an end view of the container handling system shown in FIGS. 1 and 2 with the stabilising legs retracted and with a boom thereof shown in its retracted position.

The lower pan 14 of the boom 12 includes an extension or extended portion 28 to which opposed hydraulic rams 15, 16 are linked. Retraction and extension of the hydraulic rams 15, 16 pivots the boom 12 through its angular travel transverse to the vehicle, details of which are shown in FIGS. 1 and 2. Again the hydraulic rams 15, 16 are linked to either the power pack or another hydraulic power supply.

Figure 7:
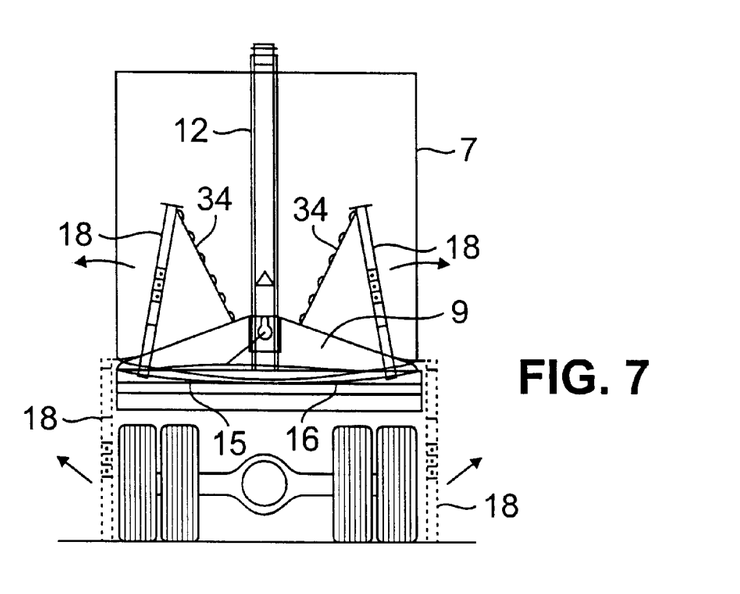
FIG. 7 is an end elevation of the container handling system shown in FIGS. 5 and 6.
Figure 8:
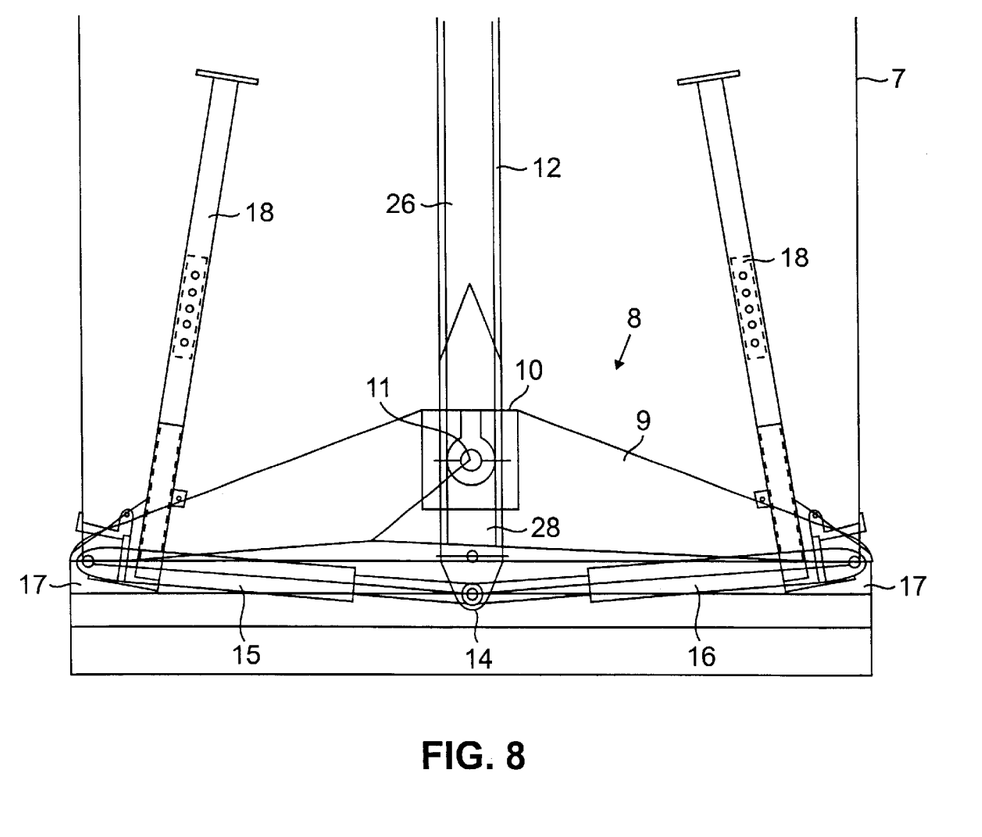
FIG. 8 is a detail on an enlarged scale of part of a transverse assembly of the type positioned at each and of the trailer shown in FIGS. 1 to 7.

At each corner 17 of the base 9 is positioned a swinging leg 18. The swinging leg 18 adopts either the parked position shown in FIGS. 3, 4, 7 or 8 or the down position shown in FIGS. 1 and 2. The height overall of the legs 18 can be adjusted to enable the vehicle in its parked position to be stabilised. The legs 8 can be locked in their raised position by chains, cables or the like 34 (FIG. 7). In an alternative construction (not shown) the legs can be raised, lowered and/or extended hydraulically.

Figure 4:
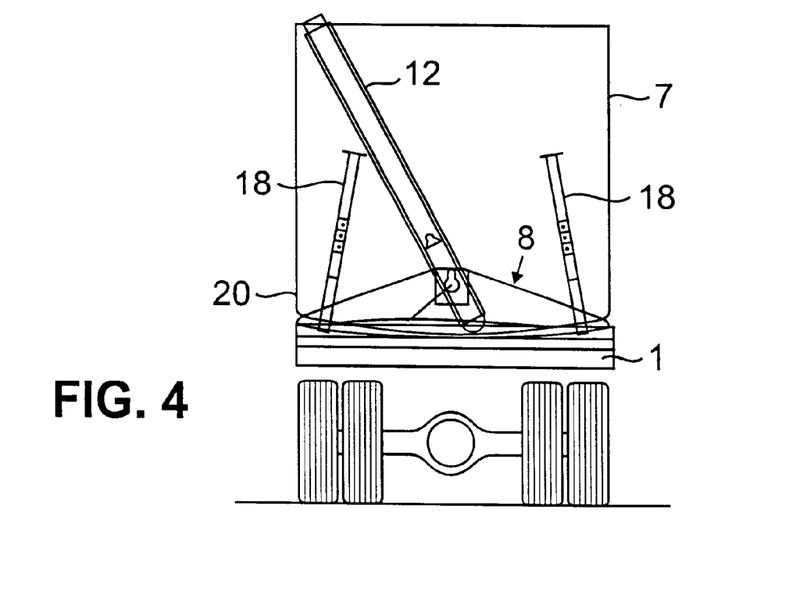
FIG. 4 in an end view of the container handling system shown in FIGS. 1 to 3 with the boom shown in its parked position.
Figure 5:
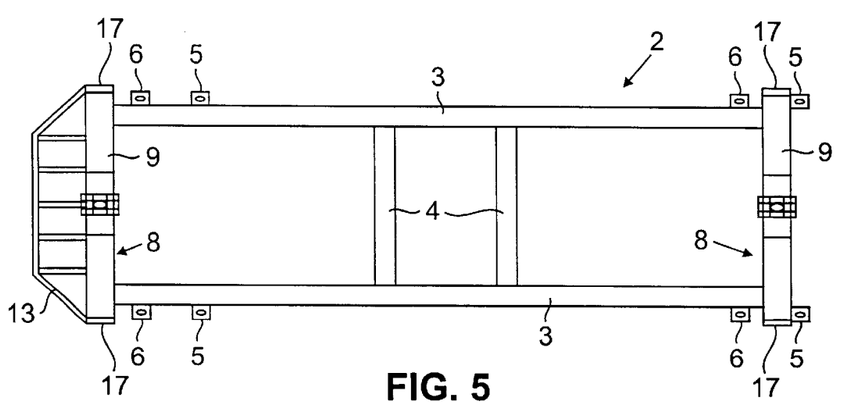
FIG. 5 is a plan view of the container handling system shown in FIG. 1.
Figure 6:
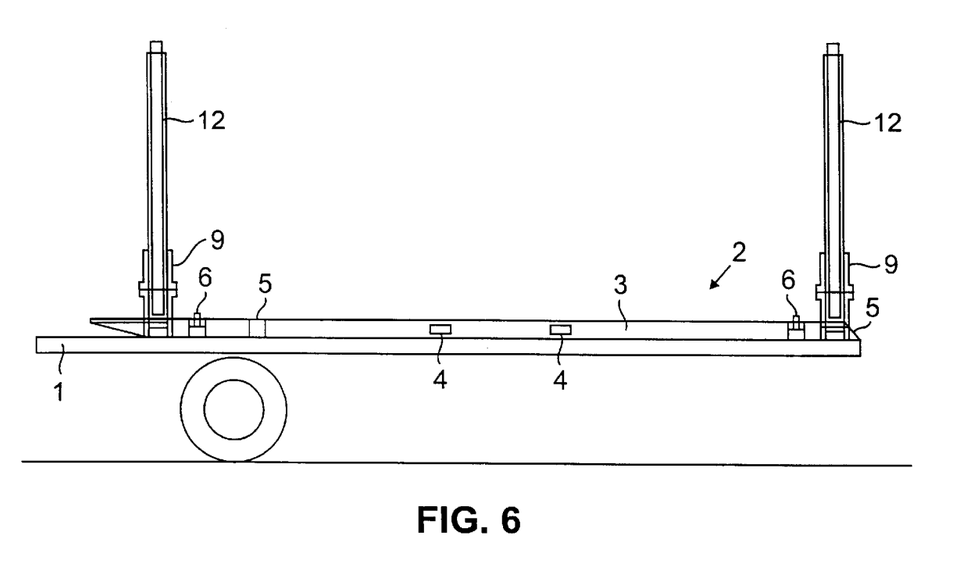
FIG. 6 is a side elevational view of the container handling system shown in FIGS. 1 and 5.

In use when fitted to a trailer vehicle the trailer is driven to a position alongside a container 7 to be loaded onto or unloaded from the chassis 3. The container 7 is connected by cables, chains or strops 19 as shown with the boom 12 partly extended and in its down position (FIG. 1). The boom 12 is then extended to raise the bottom corner 20 of the container 7 free of the deck of the vehicle. The hydraulic rams 15, 16 (FIG. 8) are then operated to swing the boom transversely above the deck of the chassis 3. The boom 12 is then retracted to position the container 7 on the chassis 3. Container locks 6 on the chassis 3 are then used to retain the container 7 on the vehicle. In this position the legs 18 are retracted and the boom 12 parked at a safe height by having it offset slightly as shown in FIG. 4.

Unloading of the container is the reverse of the operation described.

A second preferred example of container handling system is shown in FIGS. 9 to 13. In the example shown in FIGS. 9 to 13 similar parts to those described in the first example are referenced by the same numerals.

In this example the mechanism is mounted on a tray 1 of a vehicle via a main frame assembly 21. The main frame assembly 21 is shown in detail in FIGS. 11 and 12. The assembly 12 consists of beams 22 which may be 200×200×6 RHS (rectangular hollow section) beams. The beams 22 are linked at either end by members 23 which are built to withstand the weight and forces generated by a boom 12 mounted thereon. A forward end 24 of the main frame assembly 22 is a platform on which a power pack (not shown) for the unit is mounted.

Figure 9:
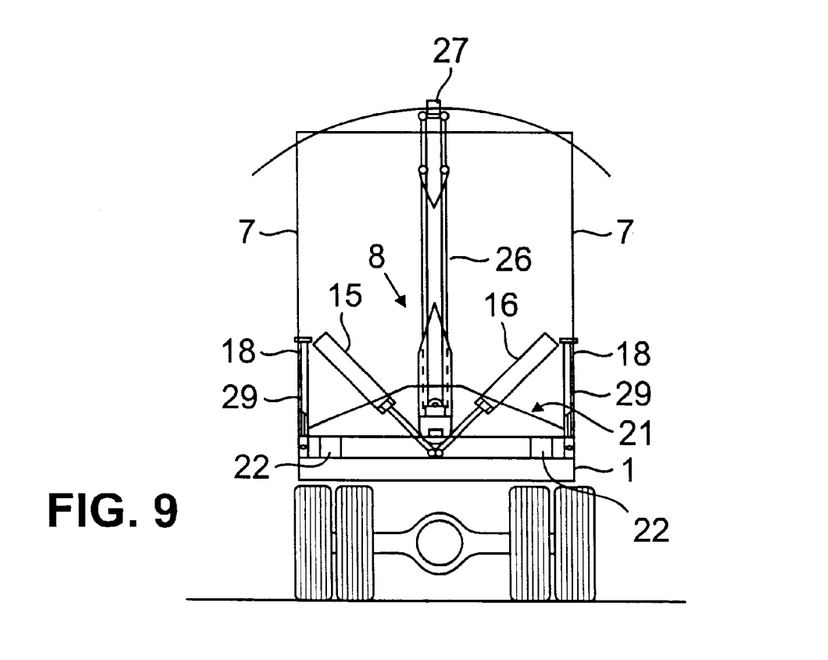
FIG. 9 is an end view of a preferred example the container handling system shown in its parked position.
Figure 10:
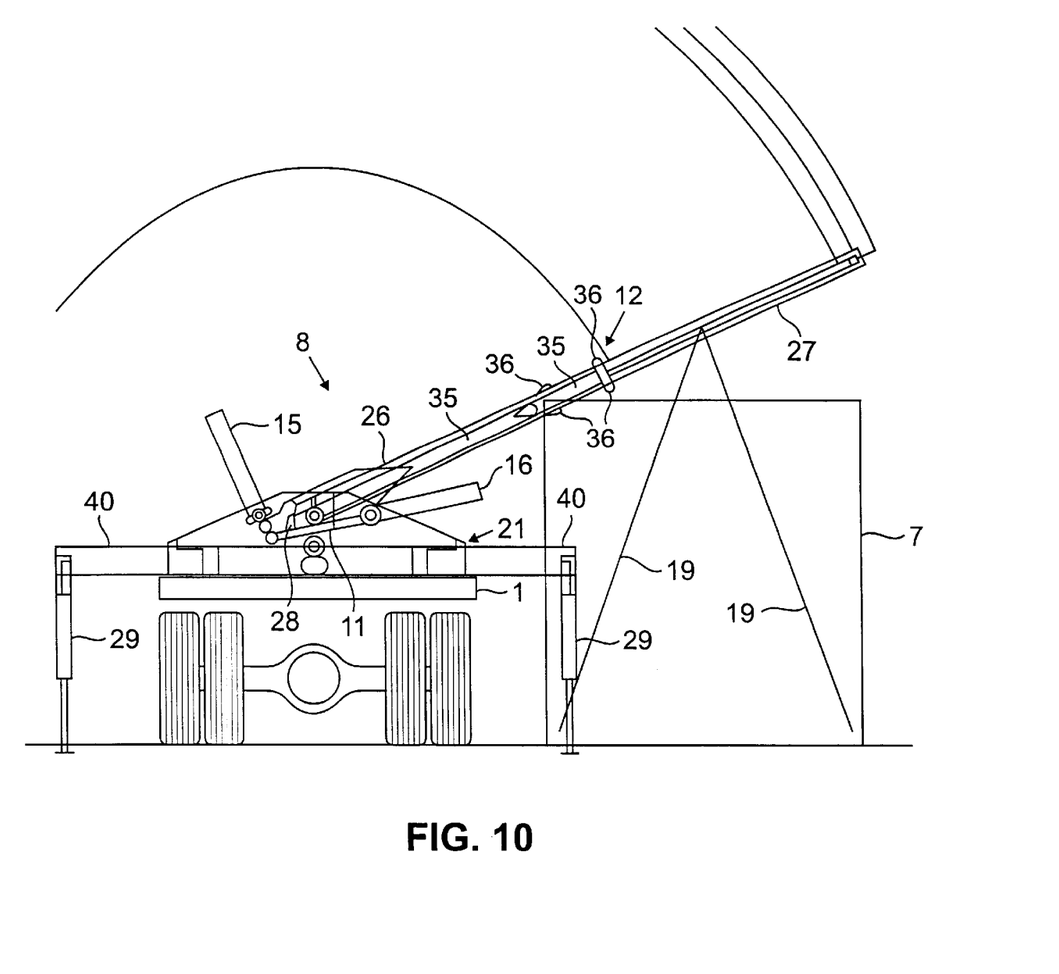
FIG. 10 is an and view of the example shown in FIG. 9 with its stabiliser legs and boom extended.
Figure 11:
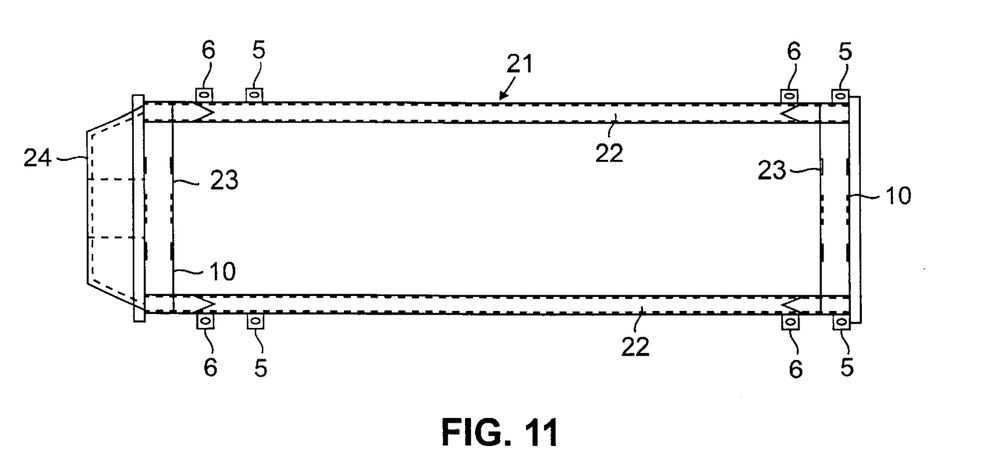
FIG. 11 is a plan view of a main frame assembly for the preferred example shown in FIGS. 9 and 10.
Figure 12:
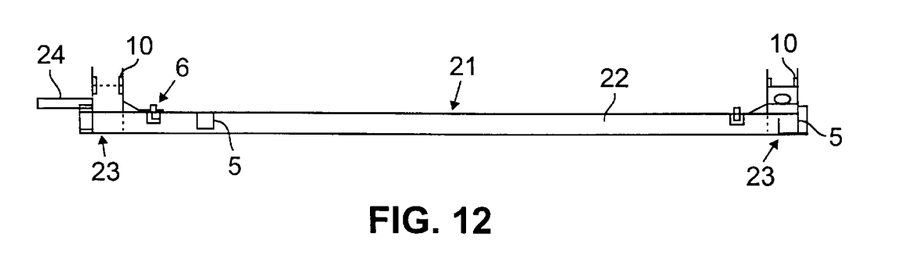
FIG. 12 is a side elevation of the main frame assembly shown in FIG. 11.
Figure 13:
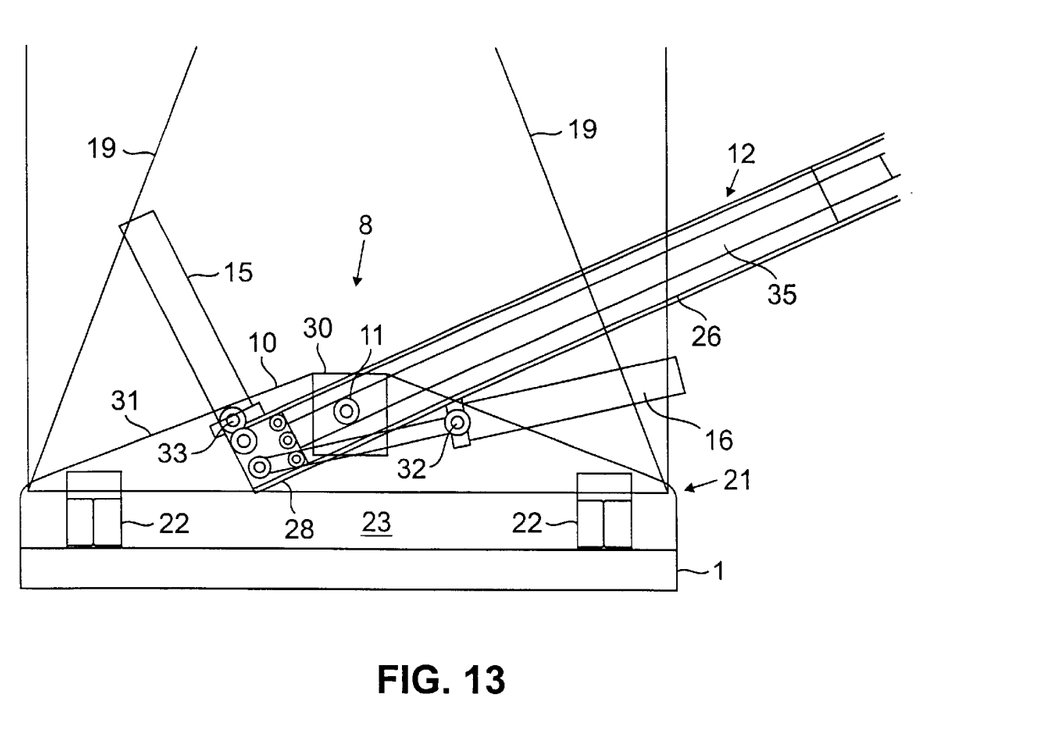
FIG. 13 is an and view on an enlarged scale of part of the assembly incorporated in the preferred example shown in FIGS. 9 and 10.

In FIGS. 9, 10 and 13 are shown an extendible boom 12 as part of a transverse assembly 8. The boom 12 incorporates a hydraulic ram or rams which extend member 27 from within member 26. The boom 12 is mounted on pivot bearing 11 as shown in FIG. 13. The bearing is mounted on plate 30 which itself is bolted or welded to upstand position 31 of bass 9. The boom 12 includes an extension 28 which has connections for the ends of hydraulic rams 15, 16 which swing the boom to either side of the vehicle as shown in FIGS. 9 and 10. The rams 15, 16, are mounted at pivot points 32, 33 on the upstand portions 31.

As best can be seen in FIG. 13, the pivot points 32, 33 support the hydraulic rams 15, 16 adjacent the end of the respective ram housing from where the ram rod extends. The hydraulic rams 15, 16 rotate about the respective pivot points 32, 33 so that each ram moves from being aligned substantially at right angles to the boom 12 when the ram is retracted (e.g. ram 15 in FIG. 13), to a position lying below the boom when the boom is swung out to the same side as the ram (e.g. ram 16 in FIG. 13) which is then extended. This allows the boom to be swung through a wide arc while having it supported by a ram acting at right angles when the leverage of the load acting on the rams is greatest.

As will be appreciated from the geometry of the boom 12 and rams 15, 16, as the boom is swung further out to one side of the boom pivot 11, the weight of the load (e.g. the container 7) carried by the boom acts increasingly against the force provided by the retracting hydraulic ram on the opposite side of the boom pivot. The effectiveness of the power of the rams is optimized by arranging the angle between the boom and the rams when retracted to be substantially at right angles, as shown in FIGS. 10 and 13.

The main frame assembly 21 has, at either end, legs 29 that are retracted by hydraulic rams or the like.

The boom 12 is constructed with an inner member 27 which telescopes within member 26. The end of member 26 has plates 35 on either side and between which are mounted rollers 36 which aid retraction and extension.

The legs 29 con be mounted on extendible arms 40 which telescope within the members 23.

In use this version of the invention operates in the same manner as the first example This example can be manufactured in two sizes. The first is constructed to load/unload 4 tonne containers. This example would be powered by a 13 h/p diesel motor which is adapted to provide sufficient hydraulic power. An improved capacity unit may be provided which can lift 8 tonne containers.

The main frame assembly 21 has standard twist lock connectors 6 for locating a container in position. The invention can be used to unload trailers or trucks by lifting containers 7 off a truck and right across the assembly 21. Alternatively it can be used to stack containers on top of one another.

Thus by this invention there is provided a mechanism for loading or unloading containers from either side of a vehicle.

A particular example has been described and where in the aforegoing description mechanical alternatives are available these are considered to be incorporated, although not specifically mentioned.

What is claimed is:

1. A mechanism for loading, unloading and trans-shipping a container relative to a tray and adapted for attachment to a vehicle, the mechanism comprising an assembly mounted transversely at each end of the tray, each said assembly comprising a boom mounted by a pivot at the center of the assembly, the boom having a telescoping part and an extension part on opposite sides of the pivot, with a pair of hydraulic rams, each hydraulic ram being linked to a respective link point on said extension part, the pair of hydraulic rams being adapted to control transverse movement of the boom about the central pivot from one side of the tray to an opposite side of the tray when one of the rams retracts and the other of the rams extends, during which movement each ram remains substantially above the respective link point on said extension part.

2. A mechanism according to claim 1, wherein each assembly incorporates on each side of the tray a stabilizing leg, the stabilizing legs having a first position for travel of said mechanism in which said stabilizing legs are parked generally upright relative to the tray, the boom being retracted to be generally upright on the assembly, and the stabilizing legs having a second position for operation of the mechanism in which said stabilizing legs are down in contact with the ground.

3. The mechanism according to claim 2, wherein, the stabilizing legs in said first position, parked generally upright relative to the tray, are angled slightly from vertical to reduce the vertical height of the assembly.

4. A mechanism as claimed in claim 1, wherein each hydraulic ram, when retracted, is aligned substantially at right angles to the boom.

5. A mechanism as claimed in claim 1, wherein each hydraulic ram has a housing from one end of which a ram rod extends, the housing being attached substantially adjacent said one end to a fixed part of said assembly.

6. A vehicle incorporating a container handling apparatus comprising a mechanism for loading, unloading and transshipping a container relative to a tray attached to the vehicle, the mechanism comprising an assembly mounted transversely at each end of the tray, each said assembly comprising a boom mounted by a pivot at the center of the assembly, the boom having a telescoping part and an extension part on opposite sides of the pivot, with a pair of hydraulic rams, each hydraulic ram being linked to a respective link point on said extension part, the pair of hydraulic rams being adapted to control transverse movement of the boom about the central pivot from one side of the tray to the other when one of the rams retracts and the other of the rams extends, during which movement each ram remains substantially above the respective link point on said extension part.

7. A vehicle as claimed in claim 6, wherein each hydraulic ram, when retracted, is aligned substantially at right angles to the boom.

8. A vehicle as claimed in claim 6, wherein each hydraulic ram has a housing from one end of which a ram rod extends, the housing being attached substantially adjacent said one end to a fixed part of said assembly.

* * * * *